(12) United States Patent
Parkulo

(10) Patent No.: US 7,398,097 B2
(45) Date of Patent: Jul. 8, 2008

(54) DUAL-MESH NETWORK AND COMMUNICATION SYSTEM FOR EMERGENCY SERVICES PERSONNEL

(75) Inventor: Craig Michael Parkulo, Concord, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 76 days.

(21) Appl. No.: 11/343,776

(22) Filed: Jan. 31, 2006

(65) Prior Publication Data
US 2006/0125630 A1  Jun. 15, 2006

Related U.S. Application Data

(63) Continuation-in-part of application No. 10/744,901, filed on Dec. 23, 2003, now Pat. No. 7,263,379.

(60) Provisional application No. 60/648,595, filed on Jan. 31, 2005, provisional application No. 60/436,038, filed on Dec. 23, 2002.

(51) Int. Cl.
*H04Q 7/20* (2006.01)

(52) U.S. Cl. .......... 455/521; 455/404.1; 455/404.2; 455/557; 709/238; 709/243; 370/238; 370/254; 370/351; 340/501; 340/506; 340/532; 340/539.13; 340/539.17; 340/539.22; 340/539.27; 340/586; 340/870.17

(58) Field of Classification Search ............ 455/66.1, 455/90.1, 90.2, 90.3, 100, 404.1, 404.2, 428, 455/445, 507, 521, 557; 370/229, 238, 254, 370/351, 392, 408, 409; 340/501, 505, 506, 340/532, 539.1, 539.11, 539.13, 539.16, 340/539.17, 539.22, 539.26, 539.27, 573.1, 340/573.4, 584, 586, 588, 589, 593, 693.5, 340/870.17; 709/238, 243; 701/207, 217, 701/300; 348/61, 143, 160, 161
See application file for complete search history.

(56) References Cited

U.S. PATENT DOCUMENTS

| | | | |
|---|---|---|---|
| 4,468,656 A | 8/1984 | Clifford et al. | |
| 4,906,972 A | 3/1990 | Spencer | |
| 5,392,771 A | 2/1995 | Mock et al. | |
| 5,552,772 A | 9/1996 | Janky et al. | |
| 5,564,429 A | 10/1996 | Bornn et al. | |
| 5,568,121 A | 10/1996 | Lamensdorf | |
| 5,596,652 A | 1/1997 | Piatek et al. | |
| 5,689,234 A | 11/1997 | Stumberg et al. | |
| 5,738,092 A | 4/1998 | Mock | |
| 5,793,882 A | 8/1998 | Piatek et al. | |
| 5,815,417 A | 9/1998 | Orr | |
| 5,864,481 A | 1/1999 | Gross et al. | |
| 5,943,922 A | 8/1999 | Rolfe | |
| 5,950,133 A | 9/1999 | Bledsoe | |
| 5,977,913 A | 11/1999 | Christ | |
| 5,990,793 A | 11/1999 | Bieback | |
| 6,031,454 A | 2/2000 | Lovejoy et al. | |
| 6,072,396 A | 6/2000 | Gaukel | |
| 6,091,331 A * | 7/2000 | Toft et al. | ............ 340/539.11 |
| 6,100,806 A | 8/2000 | Gaukel | |
| 6,198,394 B1 | 3/2001 | Jacobsen et al. | |
| 6,201,475 B1 | 3/2001 | Stumberg et al. | |
| 6,219,346 B1 | 4/2001 | Maxemchuk | |
| 6,243,039 B1 * | 6/2001 | Elliot | ............ 342/457 |
| 6,268,798 B1 | 7/2001 | Dymek et al. | |

| | | | |
|---|---|---|---|
| 6,285,857 B1 | 9/2001 | Javitt | |
| 6,310,552 B1* | 10/2001 | Stumberg et al. | 340/573.1 |
| 6,333,694 B2 | 12/2001 | Pierce et al. | |
| 6,472,988 B1 | 10/2002 | Feld et al. | |
| 6,504,794 B2 | 1/2003 | Haase et al. | |
| 6,522,531 B1 | 2/2003 | Quintana et al. | |
| 6,538,623 B1 | 3/2003 | Parnian et al. | |
| 6,549,845 B2 | 4/2003 | Eakle et al. | |
| 6,606,993 B1* | 8/2003 | Wiesmann et al. | 128/204.23 |
| 6,675,091 B2 | 1/2004 | Navab | |
| 6,703,930 B2 | 3/2004 | Skinner | |
| 6,826,117 B2 | 11/2004 | Haase et al. | |
| 6,850,844 B1* | 2/2005 | Walters et al. | 701/216 |
| 6,853,303 B2 | 2/2005 | Chen et al. | |
| 6,859,725 B2 | 2/2005 | Challoner et al. | |
| 6,894,610 B2* | 5/2005 | Schubert et al. | 340/531 |
| 6,899,101 B2* | 5/2005 | Haston et al. | 128/204.26 |
| 6,930,608 B2* | 8/2005 | Grajales et al. | 340/573.5 |
| 6,965,344 B1 | 11/2005 | Halsey et al. | |
| 6,999,441 B2 | 2/2006 | Flammer et al. | |
| 7,034,678 B2 | 4/2006 | Burkley et al. | |
| 7,079,831 B2* | 7/2006 | Schwartzman et al. | 455/404.1 |
| 7,089,930 B2* | 8/2006 | Adams et al. | 128/201.27 |
| 7,113,089 B2 | 9/2006 | Ho | |
| 7,126,951 B2* | 10/2006 | Belcea et al. | 370/400 |
| 7,148,803 B2 | 12/2006 | Brandy et al. | |
| 2001/0034793 A1 | 10/2001 | Madruga et al. | |
| 2001/0036832 A1 | 11/2001 | McKay | |
| 2001/0048364 A1* | 12/2001 | Kalthoff et al. | 340/573.1 |
| 2002/0008625 A1* | 1/2002 | Adams et al. | 340/573.1 |
| 2002/0058508 A1 | 5/2002 | Pallas et al. | |
| 2002/0065594 A1 | 5/2002 | Squires et al. | |
| 2002/0065868 A1 | 5/2002 | Lundsford et al. | |
| 2002/0081970 A1 | 6/2002 | Wingren | |
| 2002/0135488 A1 | 9/2002 | Hibbs et al. | |
| 2002/0159409 A1 | 10/2002 | Wolfe et al. | |
| 2002/0188402 A1 | 12/2002 | Huang et al. | |
| 2003/0078029 A1 | 4/2003 | Petite | |
| 2003/0152061 A1 | 8/2003 | Halsey et al. | |
| 2003/0165128 A1 | 9/2003 | Sisodia et al. | |
| 2003/0214397 A1 | 11/2003 | Perkins et al. | |
| 2004/0001442 A1 | 1/2004 | Rayment et al. | |
| 2004/0004537 A1* | 1/2004 | Flick | 340/5.62 |
| 2004/0004547 A1 | 1/2004 | Appelt et al. | |
| 2004/0008663 A1 | 1/2004 | Srikrishna et al. | |
| 2004/0070515 A1 | 4/2004 | Burkley et al. | |
| 2004/0087316 A1* | 5/2004 | Caci | 455/456.1 |
| 2004/0088584 A1 | 5/2004 | Shachar et al. | |
| 2004/0185822 A1* | 9/2004 | Tealdi et al. | 455/404.1 |
| 2004/0223469 A1* | 11/2004 | Bahl et al. | 370/331 |
| 2005/0001720 A1* | 1/2005 | Mason et al. | 340/539.13 |
| 2005/0065678 A1* | 3/2005 | Smith et al. | 701/29 |
| 2005/0124377 A1* | 6/2005 | Shih et al. | 455/552.1 |
| 2005/0152396 A1* | 7/2005 | Pichna et al. | 370/467 |
| 2005/0185606 A1 | 8/2005 | Rayment et al. | |
| 2005/0239451 A1* | 10/2005 | Periyalwar et al. | 455/425 |
| 2005/0245272 A1* | 11/2005 | Spaur et al. | 455/456.3 |
| 2006/0023681 A1 | 2/2006 | A'Rafat | |
| 2006/0079180 A1* | 4/2006 | Sinivaara | 455/41.2 |
| 2006/0087993 A1* | 4/2006 | Sengupta et al. | 370/310 |
| 2006/0120370 A1 | 6/2006 | Ginchereau et al. | |
| 2006/0158329 A1 | 7/2006 | Burkley et al. | |
| 2006/0216011 A1 | 9/2006 | Godehn | |
| 2006/0273894 A1 | 12/2006 | Goehler | |
| 2007/0129045 A1* | 6/2007 | Aerrabotu | 455/343.5 |

FOREIGN PATENT DOCUMENTS

| | | |
|---|---|---|
| EP | 1 379 026 | 1/2004 |
| WO | WO 03/050689 | 6/2003 |

OTHER PUBLICATIONS

Radio Frequency & Communications Planning Unit, "Requirement No. MG-41 (Issue 1); A Cardinal Points Requirement for a Radio Telemetry System for Use by the Fire Service." Jan. 12, 1994.

A Fire Service User Requirement for Telemetry at Incidents; JCDD/40-issue 02; Jun. 9, 1997; 23 pages.

Personnel Accountability System Technology Assessment; United States Fire Administration; Federal Emergency Management Agency; 86 pgs. Dec. 1999.

* cited by examiner

*Primary Examiner*—William Trost
*Assistant Examiner*—James D Ewart
(74) *Attorney, Agent, or Firm*—Rick Comoglio; Dean D. Small; Small Patent Law Group

(57) ABSTRACT

A communications system is provided for emergency services personnel that includes a plurality of portable devices and a base station. The portable devices are configured to be carried by emergency services personnel while at an emergency site. The portable devices each have a first transceiver configured to communicate over a first network and a second transceiver configured to communicate over a second network, where the first and second networks operate independent of one another. For example, they may have at least one of different first and second carrier frequencies, protocol, channels and the like. The base station has at least one transceiver for communicating with the portable devices over at least one of the first and second networks. Optionally, the first and second networks may have different transmission characteristics, such as different transmit ranges, power levels and the like.

35 Claims, 11 Drawing Sheets

DUAL-MESH NETWORK AND COMMUNICATION SYSTEM FOR EMERGENCY SERVICES PERSONNEL

CROSS-REFERENCE TO RELATED APPLICATION

This application is a continuation-in-part of U.S. patent application Ser. No. 10/744,901 filed Dec. 23, 2003, now U.S. Pat. No. 7,263,379 and entitled "PERSONAL MULTIMEDIA COMMUNICATION SYSTEM AND NETWORK FOR EMERGENCY SERVICES PERSONNEL," which is entitled to the benefit of, and claims priority to, provisional U.S. patent application Ser. No. 60/436,038, filed Dec. 23, 2002 and entitled "HANDHELD MULTIMEDIA COMMUNICATION SYSTEM FOR FIREFIGHTERS." The entirety of each of the above applications is incorporated herein by reference.

In addition, this application is entitled to the benefit of, and claims priority to, provisional U.S. patent application Ser. No. 60/648,595 filed Jan. 31, 2005 and entitled "DUAL-NETWORK LOCATER AND COMMUNICATION SYSTEM FOR EMERGENCY SERVICES PERSONNEL," the entirety of which is incorporated herein by reference.

BACKGROUND OF THE PRESENT INVENTION

The present invention relates generally to a network and communication system used by emergency personnel and more particularly to a dual mesh network and communication system for use therewith.

Firefighter or other first response personnel systems with combination location/tracking, electronics and sensor monitoring indoors/outdoors are very helpful in emergencies. It is very desirable for an incident commander to be in contact with his/her personnel and to monitor their location, the electronic sensors and electro-mechanical equipment they carry with tracking capabilities at the scene of an emergency. Conventional systems have relied on personnel arriving at the scene of an emergency and deploying temporary stationary transceivers, such as beacons, repeaters and antennas inside and outside a building or structure in order to relay information to a central base station. The deployment of these stationary transceivers is necessary to relay information to/from personnel in the building. Further, the stationary transceivers are sometimes used to triangulate the personnel's location.

However, stationary transceivers are large, heavy and require large amounts of power. Additionally, stationary transceivers, once deployed, are difficult to recover or find after the emergency is over, because stationary transceivers are typically lost or destroyed by the firefighters, emergency, or military personnel on the scene. Further, deployment of such stationary transceivers is time consuming and is often not practical under typical emergency circumstances.

SUMMARY OF THE PRESENT INVENTION

A communications system is provided for emergency services personnel that includes a plurality of portable devices and a base station. The portable devices are configured to be carried by emergency services personnel while at an emergency site. The portable devices each have a first transceiver configured to communicate over a first network and a second transceiver configured to communicate over a second network, where the first and second networks operate independent of one another. For example, they may have at least one of different first and second carrier frequencies, protocols, channels and the like. The base station has at least one transceiver for communicating with the portable devices over at least one of the first and second networks. Optionally, the first and second networks may have different transmission characteristics, such as different transmit ranges, power levels and the like.

In accordance with an alternative embodiment, a method is provided for maintaining a communications link with multiple portable devices that are configured to be carried by emergency services personnel while on-site at an emergency location. The method comprises wirelessly broadcasting an alarm message over a first network to the portable devices that are configured to be carried by emergency services personnel. The alarm message identifies a target portable device. The method further includes, in response to the alarm message, wirelessly broadcasting a search message over a second network between the portable devices. The search message identifies the target portable device. In response to the search message, the method further includes transmitting a reply message from the target portable device over the second the network, where the reply message includes target device reply information.

BRIEF DESCRIPTION OF THE DRAWINGS

Further features, embodiments, and advantages of the present invention will become apparent from the following detailed description with reference to the drawings.

DETAILED DESCRIPTION OF THE PREFERRED EMBODIMENTS

Figure 1:
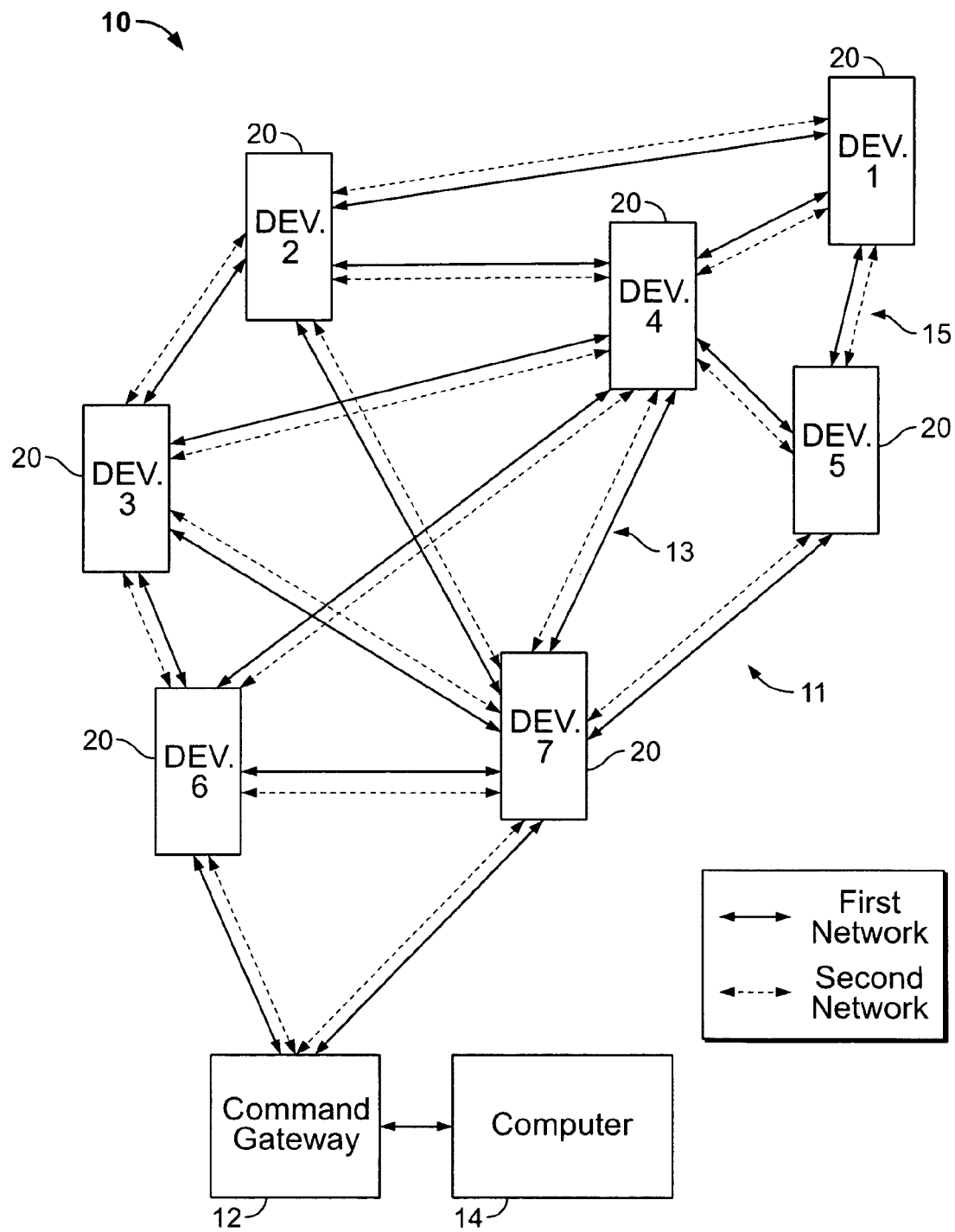
FIG. 1 is a high-level block diagram of an exemplary system formed in accordance with an embodiment of the present invention.

Referring now to the drawings, in which like numerals represent like components throughout the several views, embodiments of the present invention are next described. The following description of the embodiment(s) is merely exemplary in nature and is in no way intended to limit the invention, its application, or uses.

FIG. 1 is a block diagram of an exemplary system 10 formed in accordance with an embodiment of the present invention. The system 10 includes a plurality of portable telecommunication devices 20, a communications command gateway 12 and a base station computer 14. The portable devices 20 may be handheld, or mounted to/within equipment carried by emergency personnel. As will be further explained below, each portable device 20 is equipped for bidirectional wireless communication with the other portable devices 20 and with the command gateway 12. The command gateway 12 is equipped for bidirectional wireless communication with each portable device 20 and is further equipped for communication with the base station computer 14. Optionally, the command gateway 12 may be integrated into the base station computer 14. For example, the command gateway 12 may represent a PCMCIA card plugged into the base station computer 14, with associated software running on the base station computer 14.

The system 10 provides a dual-mesh network 11, in which each portable device 20 and the command gateway 12 communicate with one another over two separate networks 13 and 15. The first and second networks 13 and 15 are configured to operate independent of one another without interference therebetween. For example, each network 13, 15 may have a different carrier frequency (e.g., 900 MHz, 2.1 GHz, 2.4 GHz and the like) and/or different communications protocol. As another example, each network 13 and 15 may operate at very close carrier frequencies (e.g., 2.400 GHz and 2.480 GHz) that constitute separate channels within a common general frequency ranges. As another example, one or both of the first and second networks 13 and 15 may be assigned code division multiple access (CDMA) codes, or different sets of channels at a common carrier frequency or at overlapping communications pass bands.

Each of the first and second networks 13 an 15 may be bidirectional to support transmission and reception within the first network 13 and transmission and reception within the second network 15. Alternatively, one of the first and second networks 13 and 15 may be bidirectional, while the other of the first and second networks 13 and 15 is only capable of one of transmission and reception at the portable devices 20. As a further option, the first and second networks 13 and 15 may be assigned frequencies and bandwidths that exhibit different range and propagation properties through structures (e.g., walls, doors, hallways, floors, stairwells, elevators, etc.). For example, the first network 13 may be assigned a frequency, bandwidth and effective radiated power (ERP) that affords longer range capabilities (e.g., up to 2 miles), but experiences substantial attenuation when encountering structures (e.g., walls, ceilings, etc.). As another example, the second network 15 may be assigned a frequency, bandwidth and ERP that affords shorter range capabilities (e.g., up to 500 yards), but experiences very little attenuation when encountering rigid structures. In FIG. 1, the first network 13 is shown in solid lines, while the second network 15 is shown in dashed lines. The first and second networks 13 and 15 may be supported by all or only a portion of the portable devices 20.

Optionally, each portable device 20 may be interconnected with, or incorporated into, other systems or equipment carried by firefighters, soldiers, emergency workers, or other users. For example, firefighters and many other emergency services personnel typically carry a breathing apparatus when entering a dangerous environment. There are different types of breathing apparatus, with which the portable device 20 may be utilized. Examples of such breathing apparatus include a portable air purifying respirator (PAPR), a self-contained breathing apparatus (SCBA), a non-powered air purifying respirator (APR), a hose line, any combination thereof and the like. The examples described hereafter are in connection with a SCBA, but it is understood that any other breathing apparatus or combination may be substituted therefore.

Each portable device 20 may be integrated into a SCBA to form an interconnected, comprehensive safety and communications system that includes the SCBA, a portable device 20 and a number of additional components. The portable devices 20 receive SCBA and more generally on-board system data from equipment carried by the user. The on-board system data provides information related to the SCBA, status to the performance, to the environment and the like.

Figure 2:
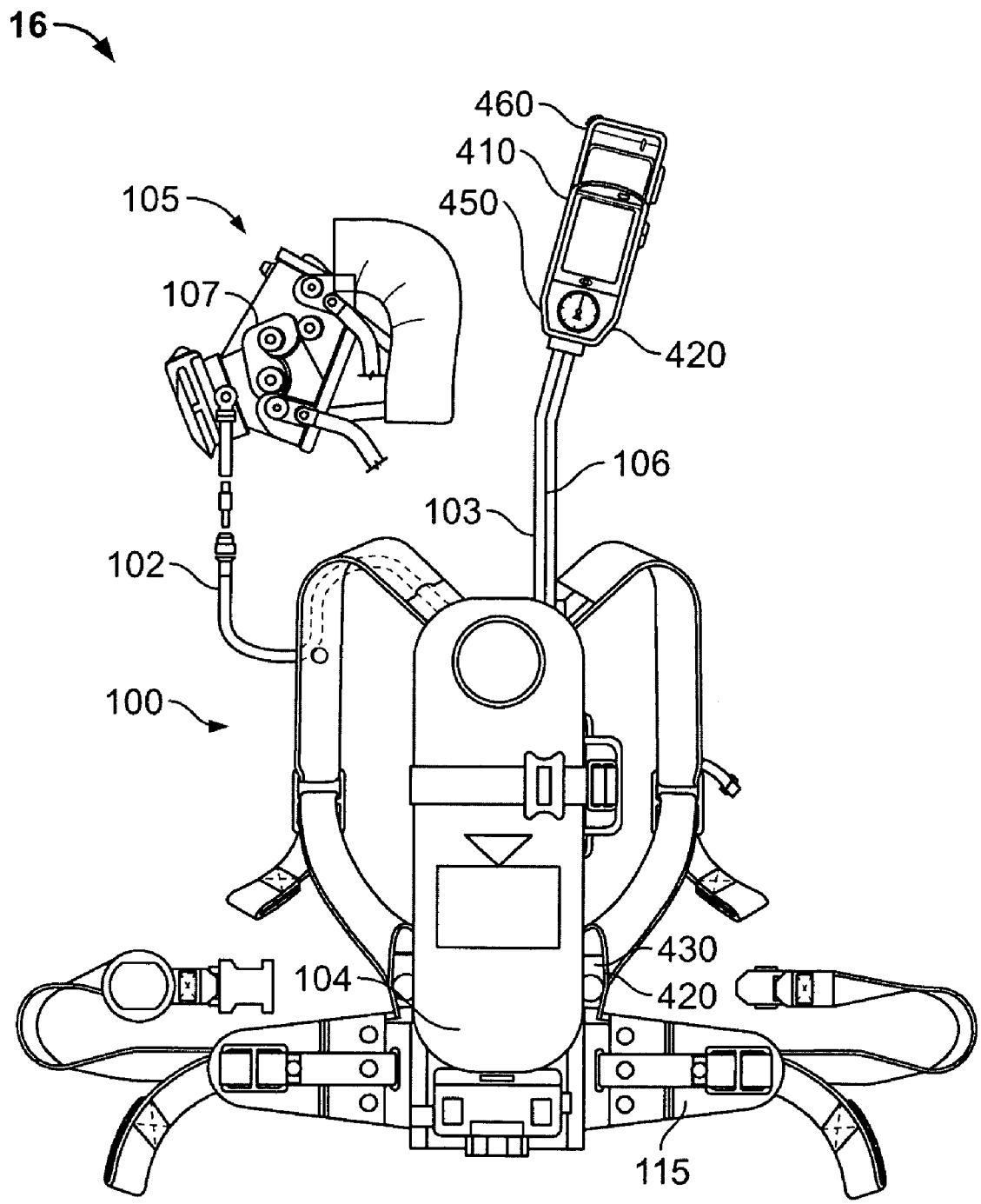
FIG. 2 is a perspective view of an exemplary integrated system carried by a firefighter or another emergency services worker formed in accordance with an embodiment of the present invention.

FIG. 2 is a perspective view of an exemplary mobile emergency system 16 carried by a firefighter or another emergency services worker. As illustrated therein, the system 16 may include a collection of firefighting or safety equipment, including a high-pressure air tank 104, mounted on a backpack 100, as well as headgear 105 that is worn on the user's head and connected to the air tank 104 by an air supply/data line 102. The line 102 supplies breathable air from the air tank 104 to the user's mouth and nose and power/data communications to a heads-up display 107. The backpack 100 includes a belt 115 and shoulder straps 117.

The system 16 includes a Personal Alert Safety System ("PASS") system 420, a personal digital assistant ("PDA") device 410, a video camera 460 and a "heads-up" display ("HUD") 107. The PASS system 420 may include both a PASS unit 430 and a separate PASS control console 450. The PASS unit 430 may be carried in a recess in the user's backpack 100, while the PASS control console 450 hangs from the end of a pressure data line 106, connected via a pressure reducer to the air tank 104, and a reinforced electronics cable sheath 103. The sheath 103 includes an electronics cable that interconnects the PASS unit 430 to the PASS control console 450 and PDA device 410. In the example of FIG. 2, PASS system 420 is shown to be distributed at two locations within the system 16, namely at the end of pressure/data line 104 and at the base of the tank 104 on belt 115. Optionally, the PASS unit 430 and PASS control console 450 may be co-located within the system 16.

The HUD 107 is connected to the other electronic components via an electronics cable may be integral with the air supply/data line 102. However, the cable may also be separate from the air supply line 102. The HUD 107 displays various information, such as an indication of the amount of air remaining in the tank 104, instructions/information received from the command gateway 12 and/or from other portable devices 20, and the like. The air tank information may be gathered via a pressure transducer located in the outlet pathway of the tank 104. Optionally, the HUD 107 includes four LED's corresponding to the tank 104 being ¼ full, ½ full, ¾ full and completely full.

Figure 3:
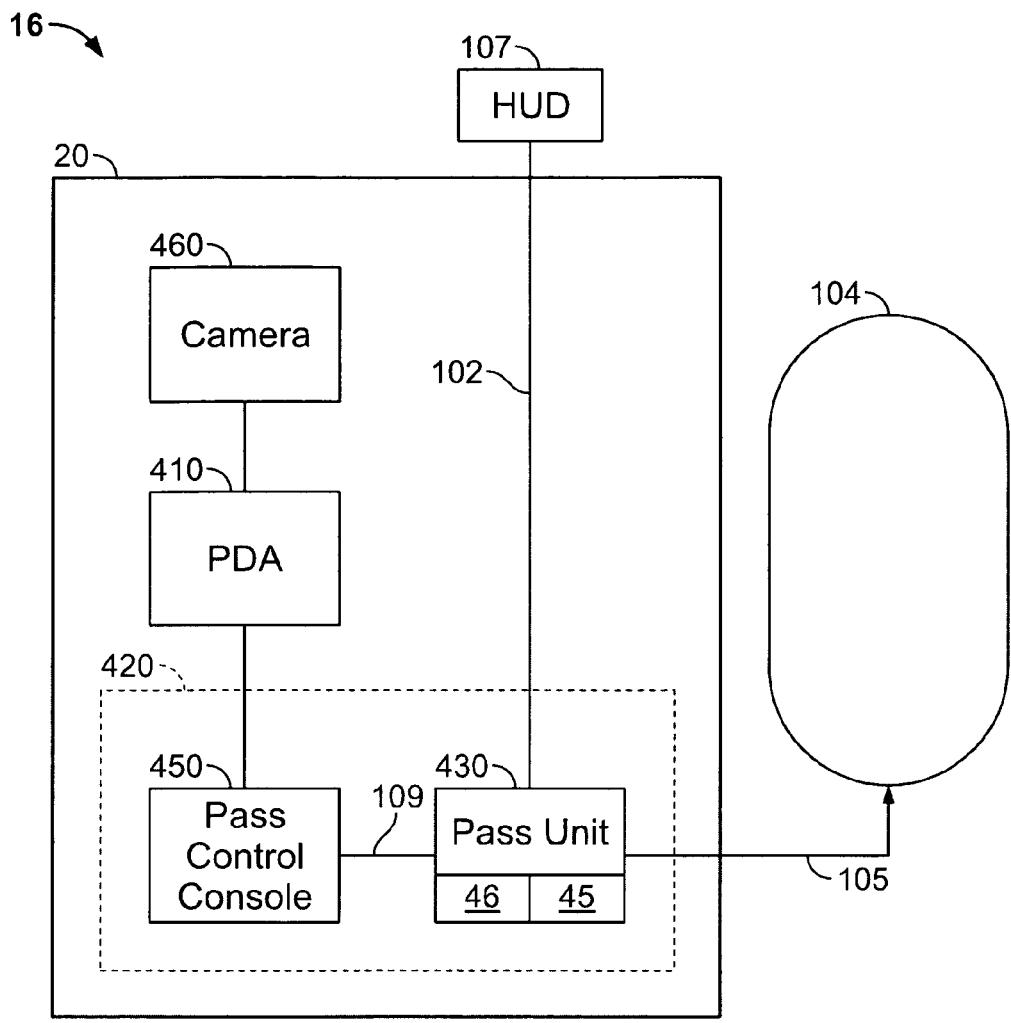
FIG. 3 is a block diagram of some of the components of FIG. 2, illustrating their interconnection.

FIG. 3 is a block diagram of a portion of the system 16 of FIG. 2. In FIG. 3, the portable device 20 is joined to the HUD device 107 through air supply/data line 102, and is joined to the air tank 104 through a pressure sensor line 105. The portable device 20 includes one or more of the camera 460, PDA device 410, PASS control console 450 and PASS unit 430. The PASS control console and unit 450 and 430 are interconnected through a communications bus 109 that is provided within the electronic cable sheath 103 (FIG. 2). The PASS unit 430 includes a motion sensor 45 and an air sensor 46. The motion sensor 45 detects motion of the system 16, while the air sensor 46 detects the air pressure in the tank 104. The PDA device 410 is communicatively coupled to the PASS control console 450, and the camera 460 is communicatively coupled to the PDA device 410.

Because firefighters and other personnel must frequently work in environments having low light or occluded surroundings, the video camera 460 is preferably an infrared or thermal imaging camera in order to add thermal awareness and enhanced visibility in such environments. By interfacing the video camera 460 with the PDA device 410, visual images generated by the video camera 460 may be displayed on the PDA display, thus potentially eliminating the need for a dedicated monitor on the video camera 460 itself. The video camera 460 is preferably mounted directly on the PDA device 10 as shown in FIG. 2 in order to enable the user to point the camera 460 in any desired direction. However, the camera 460 may alternatively be mounted elsewhere on the backpack 100, such as on the shoulder straps supporting the backpack 100, at or below shoulder height and oriented to face forward. Still further alternatively, the camera 460 may be mounted on the headgear 105.

The PASS control console 450 includes a microprocessor 42, inputs 43, 44 and a plurality of user indicators 47, such as LED's. The inputs 43 and 44 receive signals from a motion sensor 45 and an air sensor 46 in the PASS unit 430 over the communications bus 109. Optionally, the motion sensor 45 and air sensor 46 may be provided within the PASS control console 450. When the air sensor 46 is located at the PASS control console 450, an air pressure line is provided between the tank 104 and the PASS control console 450. The microprocessor 42 of the PASS control console 450 is communicably connected with the microprocessor 32 of the control section 30 by a first communications bus 49. The portable device 20 is battery powered with replaceable or rechargeable batteries 61.

Each wireless communication section 50, 60, may include separate microprocessors 52, 62, RF micro devices 53, 63, and antennas 54, 64, respectively. In addition, the first wireless communication section 50 includes inputs from other devices, such as a digital compass 57 and a temperature sensor 58. The microprocessor 52 of the first wireless communication section 50 is communicably connected with the microprocessor 32 of the control section 30 by the communications bus 65, while the microprocessor 62 of the second wireless communication section 60 is communicably connected with the microprocessor 32 of the control section 30 by a communications bus 67.

Each portable device 20 normally operates as follows. Data from throughout the system 16, such as the remaining capacity of the air tank 104 and the status of the PASS unit 430, is continually or regularly gathered via the PASS system 420 and relayed by the PASS control console 450 to the core microprocessor 32 via the first communications bus 49. The core microprocessor 32 performs general functions such as analyzing received data, displaying received data or other information on the display 35, providing status or alarm indications to users via the LED's 34, and receiving user input or control instructions via the push buttons 33. In addition, the core microprocessor 32 formats/packetizes data, including data received from the PASS system 420, and provides the packetized data to the first and second wireless communication sections 50 and 60 via the communications buses 65 and 67.

The microprocessor 32 formats and packetizes the data based on separate protocols associated with the first and second networks 13 and 15. Thus, data to be transmitted over the first network 13 is formatted and packetized based on a first protocol, while data to be transmitted over the second network 15 is formatted and packetized based on a second protocol.

When the first wireless microprocessor 52 receives data from the microprocessor 32, the data is packaged into one or more data packets for transmission via the first wireless communications network 13. If the received data is simply status data, then the cumulative size of the packets may be relatively small. However, other types of data, such as audio or video transmissions may be packetized into a series of packets that form a large stream. The microprocessor 52 forwards the packetized data to the RF micro device 53 which drives the antenna 54 to broadcast the data packets over the wireless communications network 13. For example, the RF micro-device 53 may include a local oscillator that is up converted or down converted to a frequency corresponding to the carrier frequency associated with the first communications network 13. The carrier frequency is modulated or otherwise mixed with the packetized data to form an RF data stream (or single RF data packet) that is broadcast by the antenna 54. The RF micro-device 53 may transmit and receive over a common frequency. Alternatively, the RF micro-device 53 may transmit and receive over different frequencies.

In certain instances, the RF micro-device 53 may receive data packets from different portable devices 20 at overlapping times. The RF micro-device 53 discriminates between multiple data packets received by processing the first data packet received and ignoring the overlapping data packet that arrived second in time.

Also, between transmissions, the first wireless communication section 50 intermittently monitors in-coming wireless transmissions via the antenna 54 and RF micro device 53. Wireless transmissions are received from other portable devices 20 or equipment in the first wireless communications network 13, such as the command gateway 12. Optionally, wireless transmissions may also be received from other types of communication devices that may also be incorporated into the network 13. The RF micro-device 53 performs signal processing filtering, down converting and other operations upon the received data. The RF micro-device 53 extracts, from the received RF signal, the modulated data packets. Data packets are passed from the RF micro-device 53 to the microprocessor 52, which frames the data packets and examines the data within the data packets to determine whether the portable device 20 is the intended recipient of the data or not.

Each device 20 is assigned a unique device ID that is stored at the microprocessor 52. Received data streams include at least one data packet that includes a destination device ID of the portable device 20 to which the data stream is addressed. The microprocessor 52 compares the destination device ID within a received data stream to the stored device ID of the device 20. When the received data stream is addressed to the device 20, the data is relayed by the microprocessor 52 to the core microprocessor 32. Alternatively, when the data stream is not addressed to the device 20, the data is returned to the RF micro device 53 and antenna 54 for rebroadcast. In this way, packetized data from the various portable devices 20 may be relayed between other devices 20 and the command gateway 12 over the first communications network 13. This reduces the transmission range required of the first wireless communication section 50, which in turn reduces the power requirements of the device 20 as a whole.

The second wireless communications section 60 operates in a manner similar to section 50, but over a separate second network 15. The section 60 includes a microprocessor 62 that communicates with the core microprocessor 32 over communications bus 67. The microprocessor 62 passed outgoing data to an RF micro-device 63 over link 69 for transmission by the antenna 64 over the second network 15. The antenna 64 and RF micro-device 63 monitor the second network 15 for incoming wireless transmissions. When data is received over the second network, the microprocessor 62 compares a device ID in the received data stream with a stored device ID. When the stored and received device IDs match, the received data is passed to the core microprocessor 32. When the stored and received device IDs do not match, the received data is rebroadcast by the RF micro-device 63 and antenna 64 over the second network 15. The RF micro-device 63 may transmit and receive at a common carrier frequency. However, the carrier frequency of the RF micro-device 63 my differ from the carrier frequency of the RF micro-device 53. When overlapping data packets are received, the RF micro-device 63 also processes the first data packet detected.

Optionally, the functionality of the RF microprocessors 52 and 62 may be combined into a single microprocessor or software module operating on the core microprocessor 32. Optionally, the functionality of the RF micro-devices 53 and 63 may be combined into a single RF device that drives a single antenna or both of antennas 54 and 64. Optionally, the functionality of the RF micro devices 53 and 63 may be integrated into the RF microprocessor 52 and 62, respectively. Similarly, the RF microprocessors 52 and 62, and RF micro-devices 53 and 63 may all be combined into a common integrated component.

Figure 5:
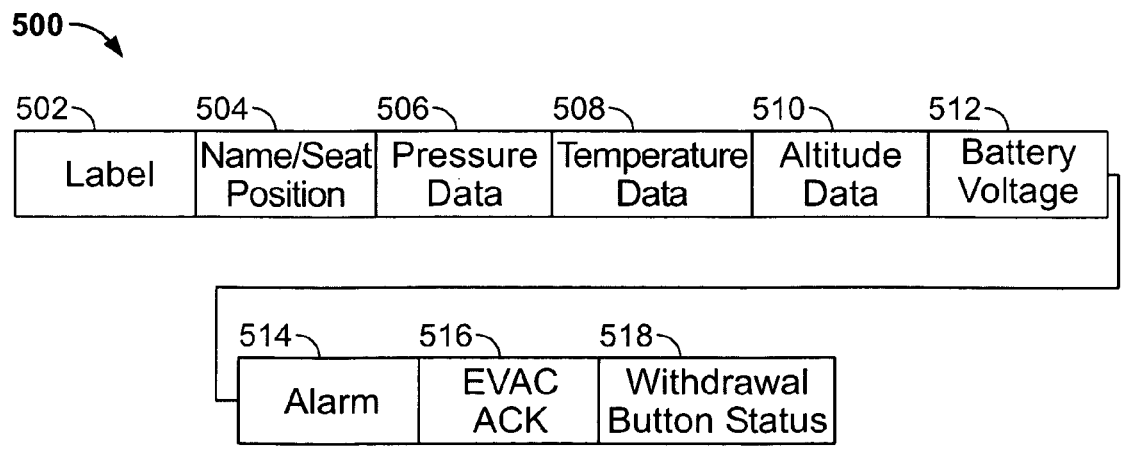
FIG. 5 is a flowchart block diagram of a data format utilized in accordance with an embodiment of the present invention.
Figure 4:
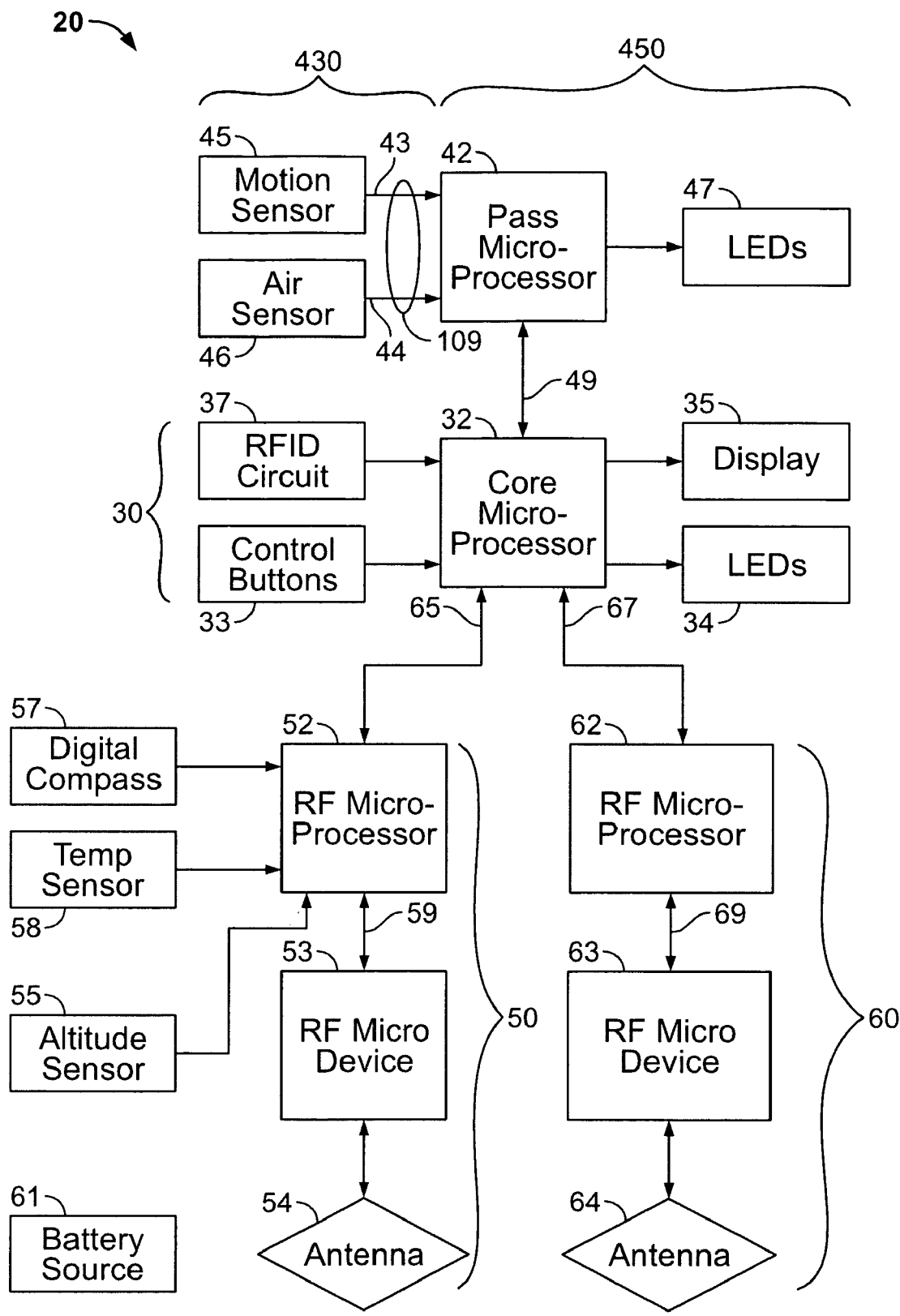
FIG. 4 is a block diagram of the internal computer hardware system of one of the portable devices of FIG. 1.

FIG. 5 illustrates an exemplary data format 500 for the protocol associated with the first network 13. The data format 500 is utilized by the microprocessor 52 to packetize data transmitted over the first network 13 to and from the base station computer 14. The data format 500 includes a series of fields, each of which may include one or more bits or bytes depending upon the amount of data bits needed to convey the associated type of information. By way of example, each of the fields illustrated in FIG. 5 may be one byte in length.

The data format 500 includes a label field 502 that includes the device or radio ID associated with the device 20 that is transmitting the data packet. For example, the label field 502 may identify a device 20 or the base station computer 14. A name/seat position field 504 includes a personal identification of an individual system 16. The personal identification may constitute a SCBA radio ID and the like. A pressure data field 506 includes information indicating the amount of air remaining in air tank 104 (e.g. ¼, ½, ¾ and full levels). The pressure data field 506 may be populated by the microprocessor 32 based on an air sensor reading from an air sensor 46. The temperature data field 508 includes information indicating the ambient air temperature surrounding the user of the equipments 16. The temperature data field 508 may be filled by the microprocessor 32 based upon information from the temperature sensor 58 that is conveyed to the microprocessor 32 via the microprocessor 52 and communications bus 65.

Altitude data field 510 includes information indicating a detected altitude surrounding the user and equipment 16. The altitude data field 510 is filled by the microprocessor 32 based upon readings at the altitude sensor 55. A batter voltage field 512 is included to indicate a measured battery voltage of the battery source 61 that is used to provide power to the device 20. An alarm field 514 is included to provide an on/off alarm status associated with a particular device 20. The alarm field 514 may indicate that an individual device 20 has manually or automatically initiated an alarm. Alternatively, the base station computer 14 may use the alarm field 514 to instruct a device 20 to activate its alarm. An evacuate acknowledge field 516 is used by the device 20 to acknowledge receipt from the base station computer 14 of an instruction to evacuate. A withdrawal button status field 518 provides an on/off indication of whether an individual device 20 has been automatically or manually designated by the base station computer 14 to be withdrawn.

Next, an example will be described in which the system 10 operates to perform an emergency search to locate a device 20 that has lost communication with the base station computer 14 over the first network 13.

Figure 6:
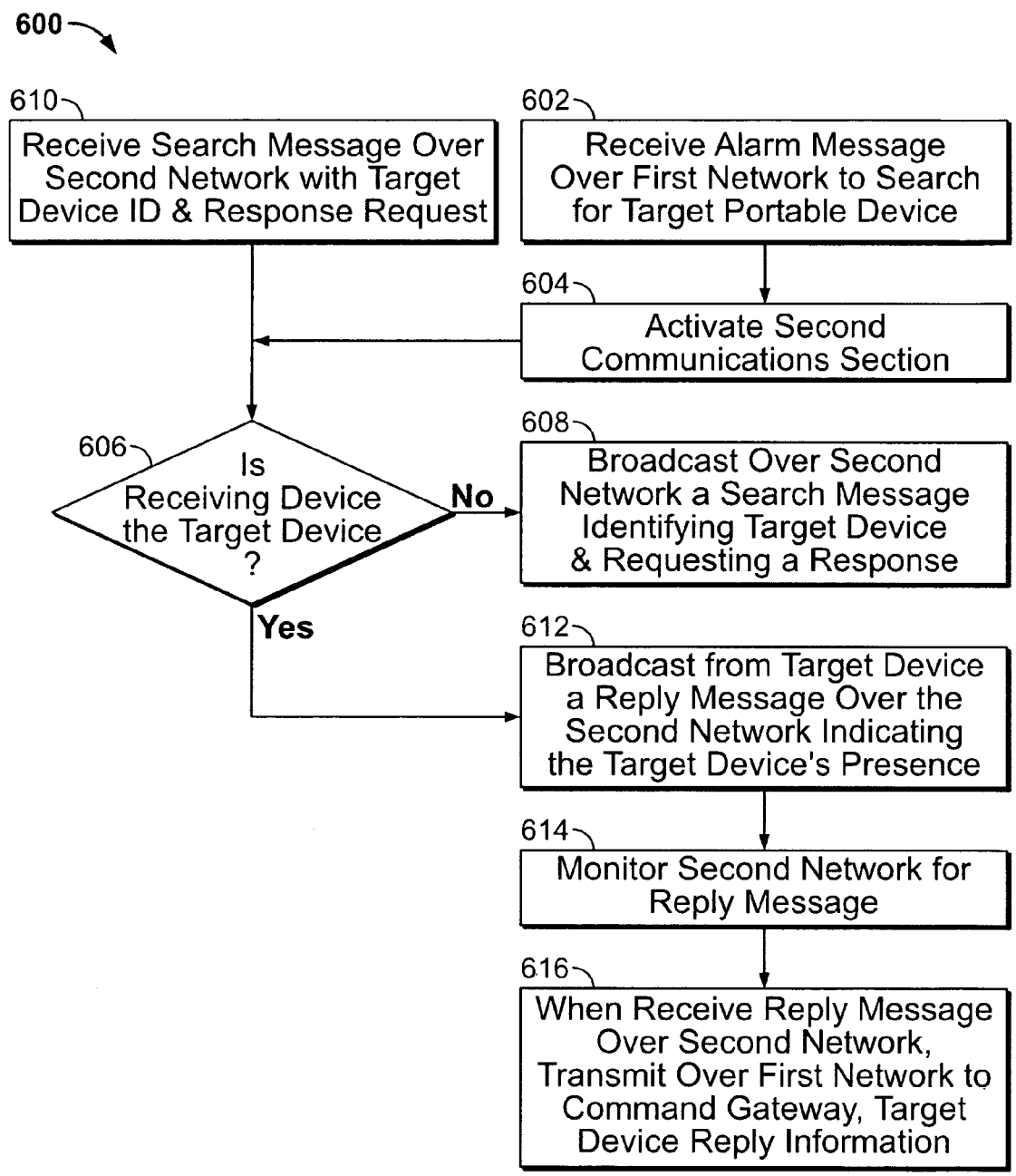
FIG. 6 is a flowchart of an emergency search processing sequence carried out in accordance with an embodiment of the present invention.

FIG. 6 illustrates an emergency search processing sequence 600 carried out by the portable device 20 when shifted to an emergency mode of operation. At 602, the microprocessor 52 of the first wireless communication section 50 receives an alarm message, via the first wireless communications network 13, instructing all portable devices 20 to search for a particular portable device 21, sometimes referred to hereinafter as the "target" device, via a second wireless communications network 15. This situation may occur in any of several situations. First, the alarm message may be triggered by the target device 21 itself, either manually (e.g., by the user to which the device 21 is assigned, or by other nearby personnel) or automatically (e.g., according to a predetermined condition or set of conditions, such as a "motionless" state as detected by the PASS unit 430). Alternatively, the alarm message may be generated by the command gateway 12, either in response to a particular message from the target device 21, or upon the detection of certain conditions by either the command gateway 12, the associated base station computer 14, or by command and control personnel interacting with the base station computer 14 or gateway 12.

Regardless of the origination of the alarm message, once the core microprocessor 32 identifies a received alarm message it activates the second wireless communication section 60, at 604. At 606, one of microprocessors 32 and 62 determine whether the receiving device 20 is the target device 21. When the portable device 20 receiving the instruction is not the target device 21 itself, then upon activation, the microprocessor 62 of the second wireless communication section 60, at 608, instructs the RF micro device 63 to broadcast a search message including a destination device ID of the target device 21. The search message identifies the target device 21 and requests the target device 21 to respond upon receiving the message. The search messages are received by devices 20 and target device 21 at 610. Next, flow returns to 606.

When, at 606, it is determined that the receiving device 20 is the target device 21, the operation of the target device 21 itself is somewhat different. If the target device 21 receives either an alarm message, via the first wireless communications network 13, or a search message, via the second wireless communications network 15, then the target device 21 operates its second wireless communication section 60 to transmit a reply message at 612, over the second wireless communications network 15, indicating its presence.

Meanwhile, at 614, other portable devices 20 use respective emergency wireless communication sections 60 to monitor for wireless transmissions from the target device 21 transmitted over the second wireless communications network 15. When a reply message from the target device 21 is received by one of the other portable devices 20, at 616, the receiving device 20 generates a new direct contact message for transmission to the command gateway 12 over the first network 13.

The direct contact message includes target device reply information and is used to inform the command gateway 12 that the device 20 has made direct contact with the target device 21. At the same time, the receiving device 20 continues to gather status information from its own integrated system 16 or the like, and to transmit the status information to the command gateway 12 using the first wireless communication section 50. Thus, the target device reply information may be incorporated into a normal status message, or may be sent independently. Regardless, the target device reply information is transmitted using the first wireless communication section 50 over the first wireless communications network 13, which has a longer range than the second wireless communication section 60. In accordance with the above process, the target device reply information is repacketized and broadcast over the first wireless communications network 13.

Optionally, the portable devices 20 making direct contact with the target device 21 via the second wireless communications network 15 may use the reply message from the target device 21 to calculate an estimated distance between the receiving device 20 and the target device 21. The distance between a receiving device 20 and the target device 21 may be calculated based on signal strength, time of flight and/or time difference of arrival. For time difference of arrival, the location of the target device 21 is calculated relative to positions of other devices 20 that each receive the reply message. In the foregoing examples, each device 20 that receives the reply message also records with the reply message a time stamp of a time at which the reply message was received. The portable devices 20 and/or base station computer 14 compares multiple time stamps from different receiving devices 20 to determine time differences between the points in time at which each receiving device 20 received the reply message. The time differences are then used to estimate a location of the target device 21 relative to the receiving devices 20.

When the location of the target device 21 is based on time of flight, the target device 21 may include the reply message and time stamp indicating when the reply message was sent. The receiving devices 20 may also record a time stamp for when a reply message is received. A comparison of the time stamps from the target device 21 and receiving devices 20 provides an estimated distance or range from the target device 21 to each receiving device 20.

The first wireless communication section 50 of each of the various portable devices 20, including that of the target device 21, continuously operate. Thus, as described previously, messages are sent and repeatedly received over the first wireless communications network 13. When a message is received, each device's dedicated microprocessor 52 determines whether it is the intended recipient for any of the various messages and, if not, retransmits the message back over the first communications network 13. Eventually, each message, including messages pertaining to the location of the target device 21, is thus transmitted and retransmitted to its intended recipient, which is typically the command gateway 12.

Throughout the process of FIG. 6, the devices 20 may communicate over corresponding predetermined channels. Alternatively, the devices 20 may communicate utilizing frequency hopping between channels. Each of the first and second networks supports bidirectional communications.

Figure 7:
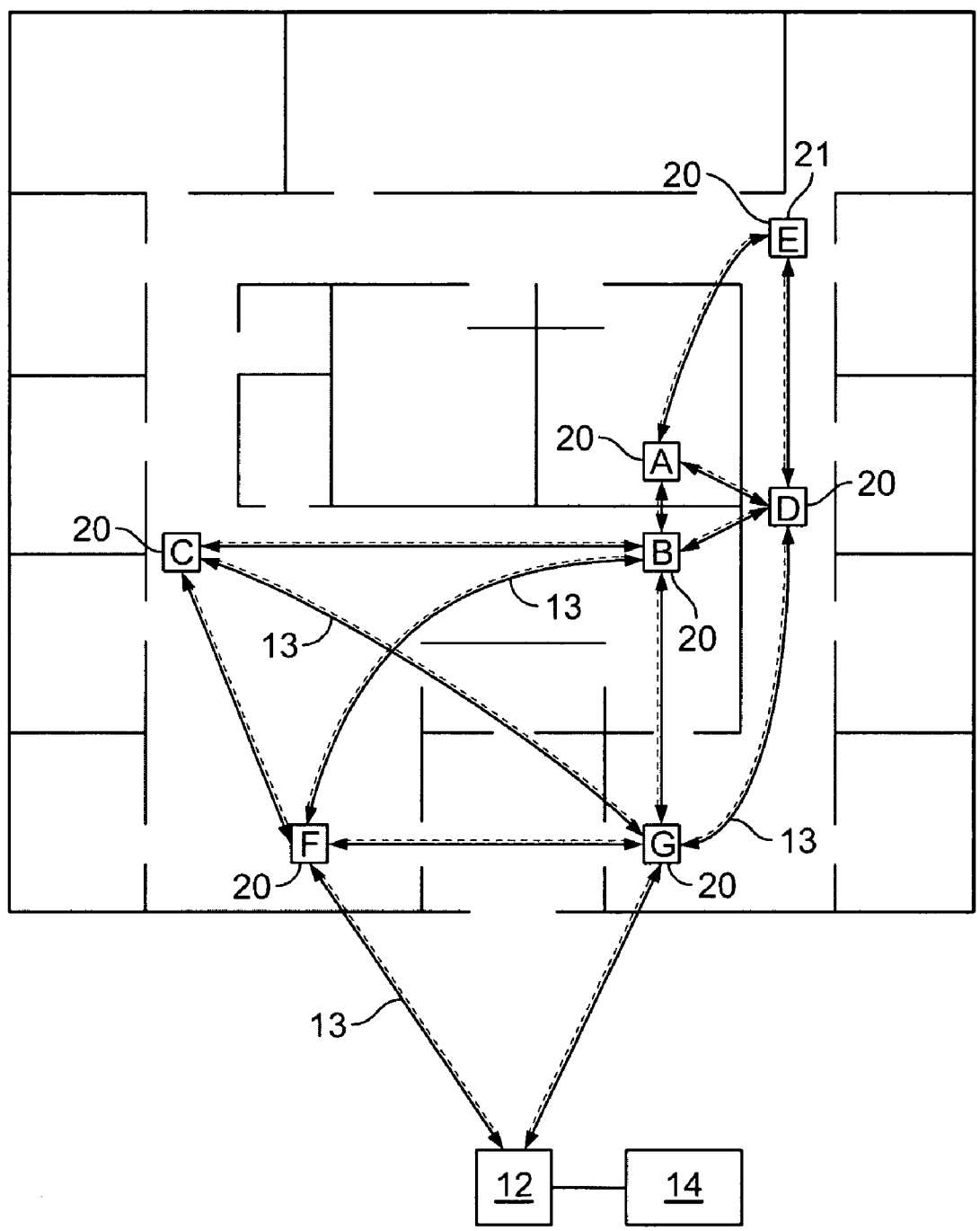
FIG. 7 is a schematic diagram of the exemplary system of FIG. 1 in normal operation, using the first wireless communications network, in a typical environment.

FIG. 7 is a schematic diagram of the exemplary system of FIG. 1 in normal operation, using the first wireless communications network 13, in a typical environment. In FIG. 7, the various devices 20 of FIG. 1 (Devices A-G) are communicating normally with each other via the first wireless communications network 13. Notably, each device 20 is capable of communicating with only a subset of the total number of devices 20 in the network, but all devices 20 are connected indirectly with the command gateway 12.

Figure 8:
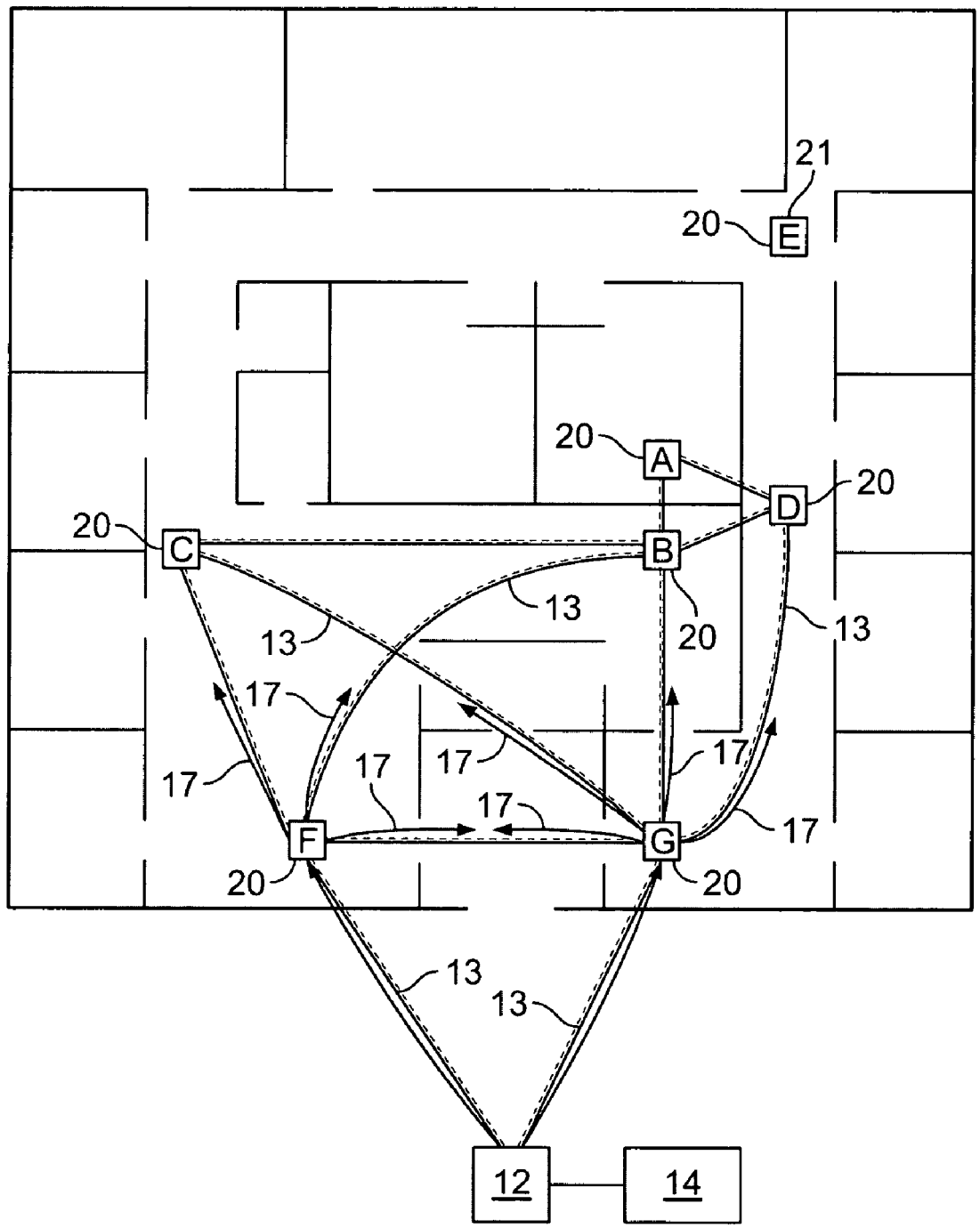
FIG. 8 is a schematic diagram similar to that of FIG. 7, illustrating the transmission of an alarm message to the portable devices.

FIG. 8 is a schematic diagram similar to that of FIG. 7, illustrating the transmission of an alarm message 17 to the various devices 20. In FIG. 8, one of the devices 20 (Device E) is no longer able to communicate with any of the other devices 20 over the first network 13 for some reason. The base station computer 14 determines that communication has been lost with device E. In response thereto, the base station computer 14 broadcasts an alarm message 17 over the first network 13. The alarm message 17 includes the unique device ID of device E. The alarm message 17 is being propagated from the command gateway 12 through the first network 13, as shown by the arrows following the network connection paths. Each device 20 that receives the alarm message 17 over the first network 13, repeats the alarm message 17 of the first network 13. In addition, each device 20 that receives the alarm message 17, broadcasts a search message 23 (FIG. 9) over the second network 13.

Figure 9:
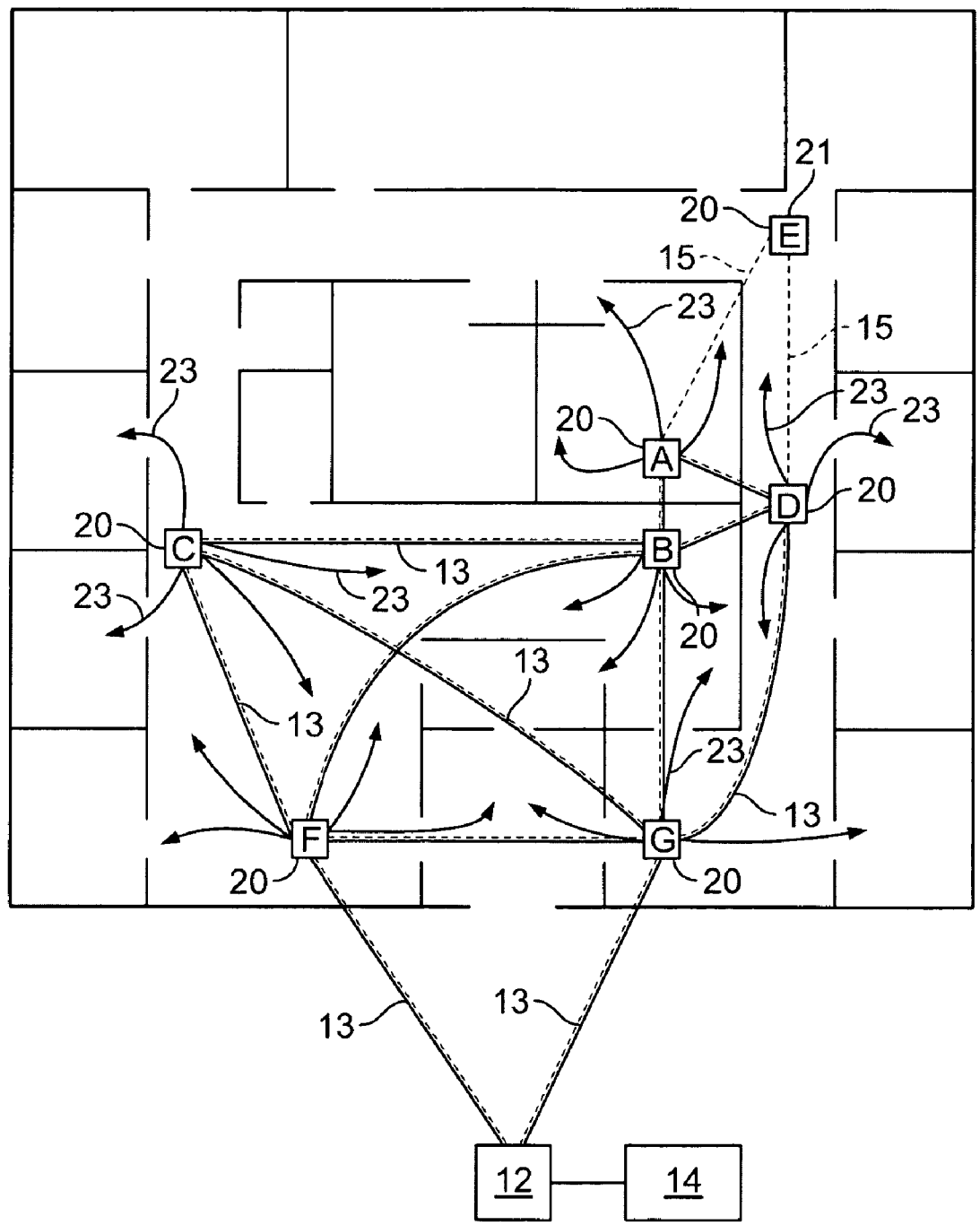
FIG. 9 is a schematic diagram similar to that of FIG. 7, illustrating the transmission of search messages from the portable devices.
Figure 10:
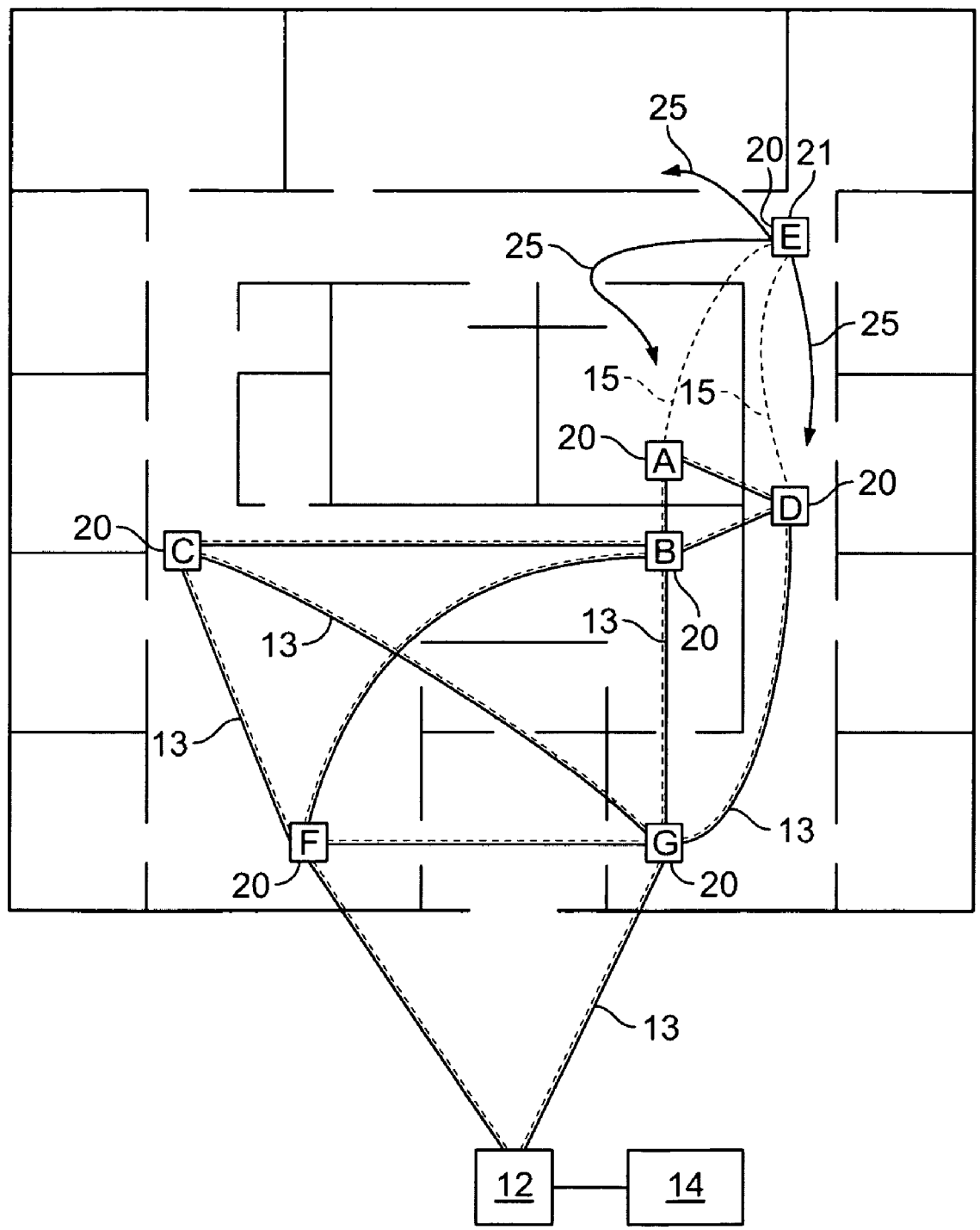
FIG. 10 is a schematic diagram similar to that of FIG. 7, illustrating the transmission of a reply message from the target device.

FIG. 9 is a schematic diagram similar to that of FIG. 7, illustrating the transmission of search messages 23 by the devices 20 (devices A-D and F-G). The messages 23 are sent over the second wireless communications network 15. The search messages 23 represent messages sent separate and apart from the first network 13. The search message 23 includes the device ID of the destination device E. FIG. 10 is a schematic diagram similar to that of FIG. 7, illustrating the transmission of a reply message 25 from the target device 21 over the second network 15. The target device 21 was close enough to receive the search message 23, via the second network 15, from Device A, Device D or both. The device E determines that the search message 23 is directed to device E. Thus, in response, device E broadcasts a reply message 25 over the second network 15. When devices A and D receive the reply message 25, devices A and D broadcast target device reply information 27 over the first network 13 that includes the device ID of the devices A and D, a time stamp for when the reply message 25 was received by device A or D and the reply message.

Figure 11:
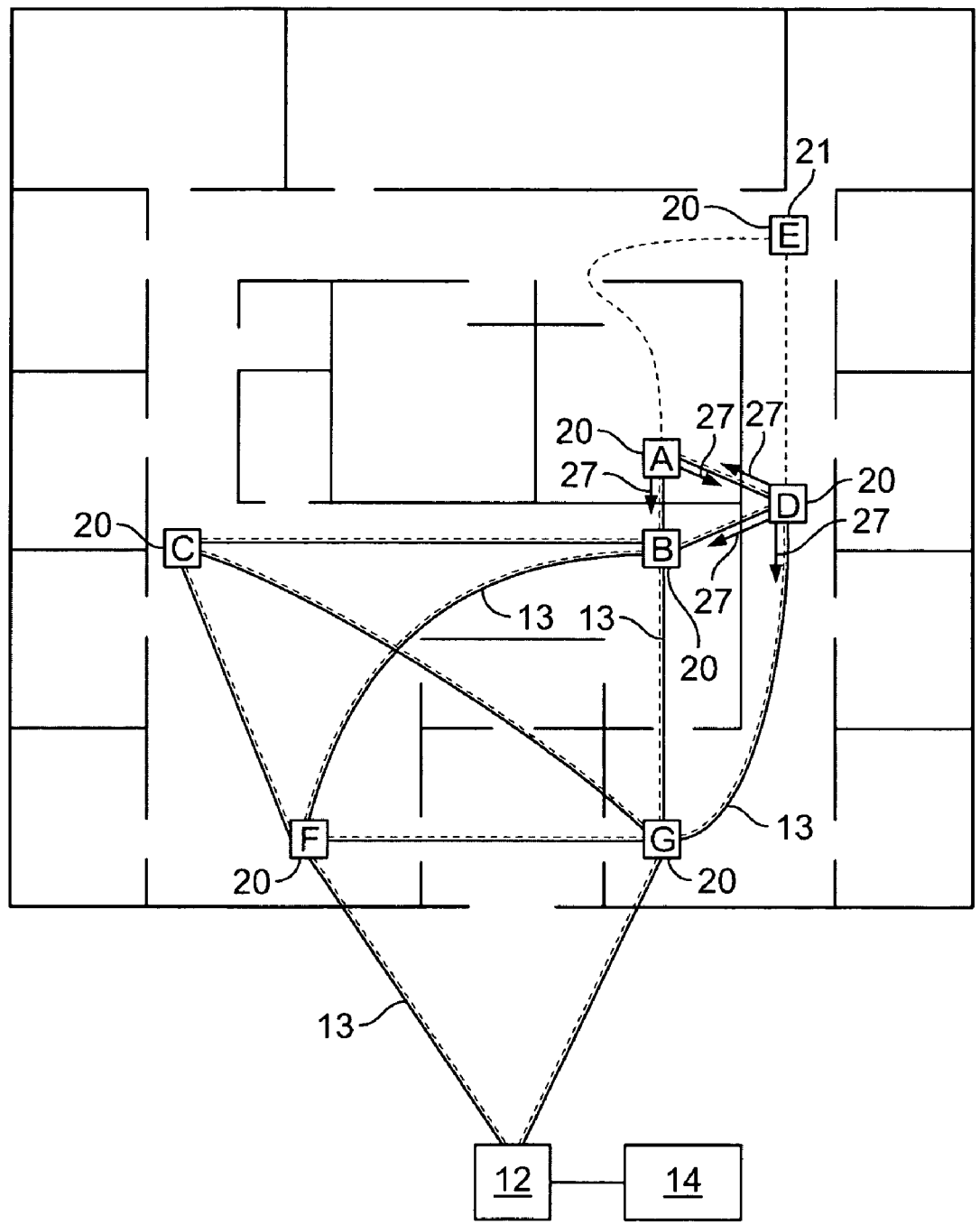
FIG. 11 is a schematic diagram similar to that of FIG. 7, illustrating the transmission of messages from portable devices reporting communication with the target device using the second wireless communications network.

FIG. 11 illustrates the transmission of target device reply information 27 reporting communication with the target device 21. Devices A and B received the reply message 25 from the target device 21 (Device E), established communication with Device E via the second network 15, and are meanwhile transmitting target device reply information 27 about Device E (including its estimated location) back through the other devices 20 to the command gateway 12 via the first wireless communications network 13. The devices 20 may pass the reply information 27 between multiple devices 20 before reaching the base station computer 14. As the reply information 27 is passed from device to device (e.g., device A to device B to device F), each device appends its device ID to the end of the message. Thus, when the base station computer 14 receives a reply message 27, the base station computer 14 is able to determine the complete path along which the reply information 27 progressed to reach base station computer 14. The two networks 13, 15 thus work in concert to avoid overloading either network and to maintain communications links with each device 20.

Figure 12:
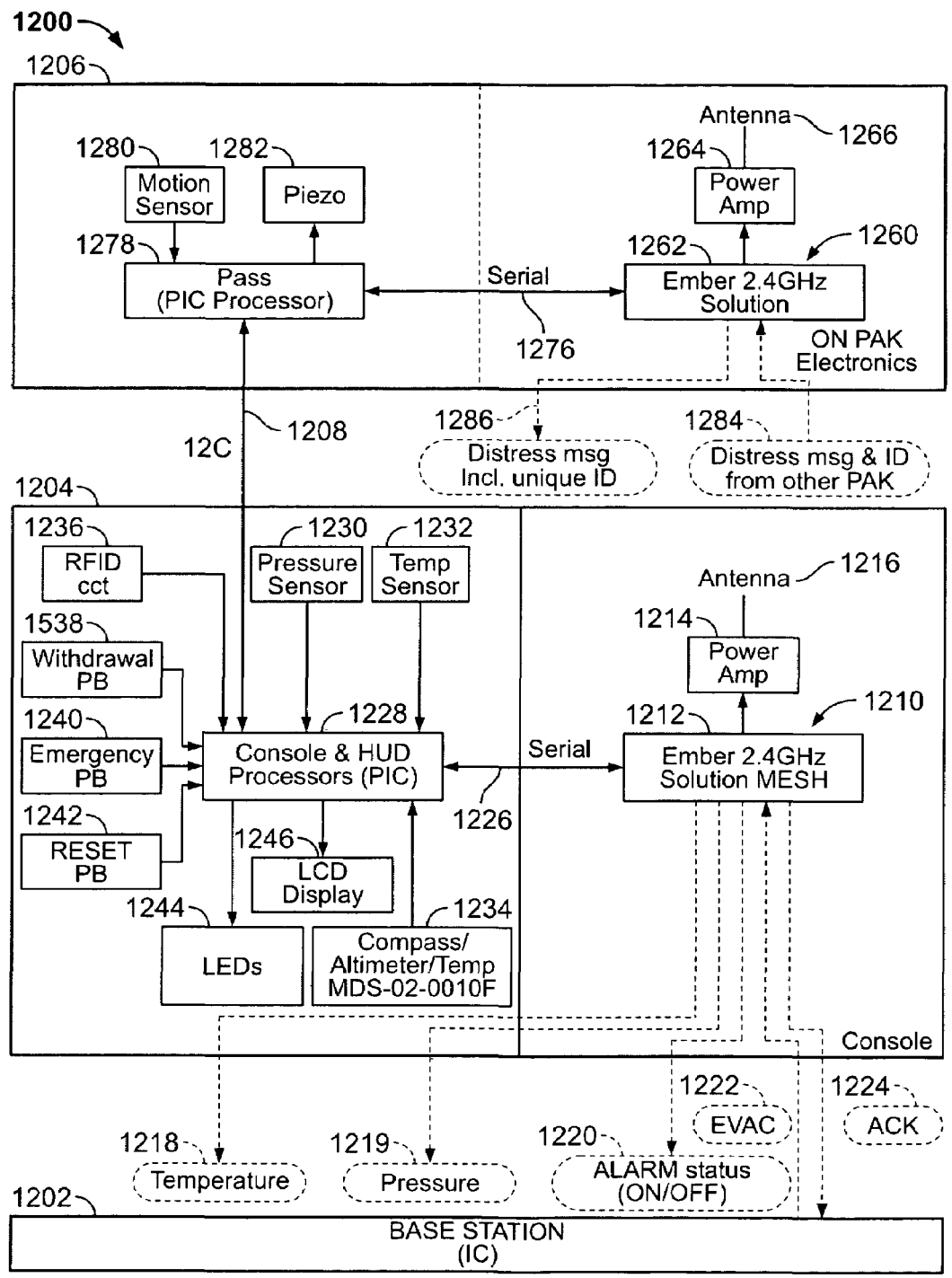
FIG. 12 illustrates a block diagram of a communications system formed in accordance with an alternative embodiment of the present invention.

FIG. 12 illustrates a functional block diagram of a communications system 1200 formed in accordance with an alternative embodiment. The communications system 1200 includes a base station 1202, a console module 1204 and a PAK module 1206. The console and PAK modules 1204 and 1206 communicate with one another over a communications bus 1208. The console module 1204 includes a transceiver 1210 that includes an RF integrated circuit (RFIC) 1212 that controls a power amp 1214 to drive an antenna 1216. The transceiver 1210 bidirectionally communicates over the first network 13 (FIG. 1) to transmit and receive various types of data, such as temperature, pressure, alarm status information 1218-1220 and the like. The transceiver 1210 receives various types of information from the base station 1202, such as evacuation instructions and acknowledgement signals 1222 and 1224 (e.g., in response to a message from a user that the user desires to withdraw or is having an emergency).

The transceiver 1210 communicates over a serial data link 1226 with a processor 1228 that is configured to perform console and heads-up display management functions. The processor 1228 receives inputs from a pressure sensor 1230, a temperature sensor 1232, a compass and altimeter sensor 1234 and the like. An RFID circuit 1236 provides user information to the processor 1228. The RFID circuit 1236 allows the user to log in and map their names/identification to a specific system. The processor 1228 communicates with the RF IC 1212 to receive status information to be communicated to the base station 1202. A series of switched (e.g., reed switches, push buttons and the like) are provided on the system to be activated by the user to manually activate various functions, such as a withdrawal switch 1238, an emergency switch 1240 and reset switch 1242. The processor 1228 controls a series of LCDs 1244 and a LCD display 1246.

The PAK module 1206 also includes a transceiver 1260 that communicates over the second network 15 with the base station 1202 and other devices. The transceiver 1260 includes a RF IC 1262 that controls the power amplifier 1264 to transmit over an antenna 1266. A serial data link 1276 is provided between the RF IC 1262 and a PASS processor 1278. The PASS processor 1278 receives an input signal from a motion sensor 1280 and controls a piezo element 1282 to produce an audible sound during certain modes of operation.

The transceiver 1260 receives, among other things, distress messages 1284 from other devices, including the device ID of the transmitting PAK module 1206. The transceiver 1260 rebroadcasts the distress messages 1286 along with the device ID of the device from which the distress message originated.

During operation, when a user activates the emergency push button 1240, the processor 1228 informs the PAK module 1206 that the emergency status has been activated. In response thereto, the PASS processor 1278 within the PAK module 1206 activates a full alarm condition with the audible alarm being generated over the piezo 1282. In addition, a visible alarm is produced at the LCD display 1246 and an emergency message is transmitted over one or both of the first and second networks 13 and 15 by the transceivers 1210 and 1260, respectively.

When the user activates the withdrawal switch 1238, such activation indicates that the user wishes to exit from the building. The user may push the withdrawal switch 1238 to inform an operator at the base station 1202 of the user's desire to exit. When the withdrawal switch 1238 is activated, the processor 1228 instructs the transceiver 1210 to convey over the first network 13 a withdrawal message. The console module 1204 and PAK module 1206 may be programmed wirelessly over one or both of the first and second networks 13 and 15.

Next, some exemplary communications between the console and PAK modules 1204 and 1206 are described. An evacuation message may be initiated at the base station 1202 and transmitted over the first network 13 to the transceiver 1210. The processor 1228 identifies the evacuation message and conveys an evacuation notification signal to the PASS processor 1278 of the PAK module 1206. The PASS processor 1278 replies with an acknowledgment (evac. acknowledge signal) to the console module 1204 which then transmit the "evac. acknowledge signal" back to the base station 1202. The "evac. acknowledge signal" is initiated manually by the user, such as by pressing the reset switch 1242 to acknowledge receipt of the evacuation signal and that an evacuation is initiated.

When the PAK module 1206 enters an alarm condition, the PASS processor 1278 conveys an alarm signal to the processor 1228. The console module 1204 then transmits the alarm status to the base station 1202 over the first network 13.

When the user activates one of the emergency reset buttons 1240 and 1242, the processor 1228 provides an interrupt to the PASS processor 1278 of PAK module 1206. Pressure data from the pressure sensor 1230 is passed through the processor 1228 to the PASS processor 1278 of the PAK module 1206 and to the transceiver 1210. The transceiver 1210 conveys the pressure data, once properly formatted into packetized data to the base station 1202. Optionally, the LCD display 1246 may display upon demand from the user, an amount of time remaining for the air tank. The LCD display may not continuously display the air time remaining information to conserve power. The user may press the reset switch 1242 in order to initiate display of the time remaining information.

While the above examples are provided in terms of processors and micro-devices, it is understood that the processors and micro-devices merely constitute functional modules that may be implemented in discrete logic, hardware, firm ware, software, in a single CPU, in multiple CPUs, in FPGAs and the like.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A communications system for emergency services personnel, the system comprising:
   portable devices to be carried by emergency services personnel while at an emergency site, the portable devices each having a first transceiver configured to communicate over a first network and having a second transceiver configured to communicate over a second network, wherein the first and second networks are independent of one another, the first network constituting a broadcasting mesh network, the portable devices communicating with one another over the first networks; and
   a base station having at least one transceiver for communicating with the portable devices.

2. The system of claim 1, wherein the portable devices broadcast device related data over the first network, the device related data including a device identification (ID) uniquely identifying a corresponding one of the portable devices that originally broadcast the device related data over the first network.

3. The system of claim 1, wherein at least one of the portable devices includes a processor configured to perform a search process to search for a target portable device based on transmission signals received over at least one of the first and second networks from the portable devices.

4. The system of claim 1, wherein the portable devices communicates broadcast device related data between one another over the first network, and wherein at least one of the portable devices receives remote device related data, from the first network, and transmits the remote device related date over the second network.

5. The system of claim 2, further comprising breathing apparatus, each of the breathing apparatus being interconnected to a corresponding one of the portable devices and providing breathing apparatus related data to the corresponding first transceiver, the first transceiver broadcasting the device related data over the first network with the corresponding device ID.

6. The system of claim 1, further comprising heads-up display (HUD) devices, each of the HUD devices being interconnected to one of the portable devices.

7. The system of claim 1, wherein at least one of he portable devices includes a thermal imaging camera.

8. The system of claim 1, wherein communicating over the first and at least one of the portable devices includes a processor that is configured to search for a target portable device based on transmission signals received over one of the first and second networks.

9. The system of claim 1, wherein each portable device includes a PASS unit, the first transceiver of the corresponding portable device broadcasting PASS related data from the PASS unit over the first network.

10. The System of claim 1, further comprising a thermal imaging camera carried by an emergency services person, the thermal imaging camera detecting thermal images of an environment where the camera is located based on a direction in which the camera is pointed, and a display coupled to the camera and the one of the portable devices, the display displaying the thermal images.

11. The system of claim 1, wherein a first portable device receives a broadcast, over the first network, of a data packet having a device II) identifying a target portable device, and in response thereto, the first portable device determines whether the received data packet is addressed to the first portable device, when the received data packet is not addressed to the first portable device, the first portable device rebroadcasting the received data packet over the first network.

12. The system of claim 1, wherein each portable device further comprises a motion sensor to identify a motionless state of the user and a processor module for transmitting a unique identification over at least one of the first and the second networks when the motionless state is identified.

13. A method of maintaining a communications link with multiple portable devices configured to be carried by emergency services personnel while on-site at an emergency location, the method comprising:
wirelessly broadcasting an alarm message over a first network from a target portable device configured to be carried by emergency services personnel while on-site at an emergency location, the alarm message identifying the target portable device;
wirelessly broadcasting a search message between the portable devices, the search message identifying the target portable device; and
transmitting a target message from the target portable device over the second network, the target message being received by other portable devices.

14. The method of claim 13, further comprising receiving the target message at a receiving portable device and transmitting the target message over a second network by the receiving portable device.

15. The method of claim 13, further comprising receiving the target message at a receiving portable device and determining at least one of distance and location information regarding the target portable device based on the target message received.

16. The method of claim 13, further comprising determining at least one of distance and location information regarding the target portable device based on one of signal strength, time difference of arrival and time of flight information derived from the target message.

17. The method of claim 13, wherein he target message represents a reply message, the method further comprising receiving the reply message at a receiving portable device and modifying the reply message, to add information identifying the receiving portable device, before retransmission of the reply message and added information.

18. The method of claim 13, wherein the target message represents a reply message, the method further comprising receiving the reply message at a receiving portable device, combining the reply message with on-board system information regarding the receiving portable device, and transmitting the reply message and on-board system information over a second network to a base station.

19. The method of claim 13, further comprising transmitting status request messages from a base station over a second network to the portable devices, the portable devices transmitting status information in response to the status request messages over the second network.

20. The method of claim 13, wherein the portable devices periodically transmit status information regarding equipment carried by the emergency personnel and interconnected to the portable device.

21. The method of claim 13, wherein the first network constitutes a broadcasting mesh network that is configured to relay at least one of alarm messages, search messages and target messages between portable devices.

22. The method of claim 13, further comprising a second network that provides long-distance communications range, wherein the first network provides short-distance communications range.

23. A method for locating a portable device, the method comprising:
configuring multiple portable devices to communicate with one another over a broadcasting mesh network, the portable devices being carried by emergency services personnel while on-site at an emergency location;
wirelessly broadcasting, from a target portable device, target transmission signal over the broadcasting mesh network, the target transmission signal including a device identification (ID) uniquely identifying the target portable device;
detecting, at a tracking portable device carried by an emergency services person, the target transmission signal from the broadcasting mesh network; and
estimating a relative location of the target portable device with respect to the tracking portable device based on the target transmission signal.

24. The method of claim 23, wherein the estimating operation is based on signal strength of the target transmission signal at the tracking portable device.

25. The method of claim 23, wherein the target transmission signal includes a data packet comprising a time stamp of a time at which the target transmission signal was broadcast from the target portable device, the estimating operation calculating at least one of a time of flight and time different of arrival based on the time stamp.

26. The method of claim 23, wherein the tracking portable device begins monitoring the broadcasting mesh network for the target transmission signal in response to a message from one of the target portable device and a base station.

27. The method of claim 23, further comprising wirelessly broadcasts at least one of an alarm message, a search message and a reply message over the broadcasting mesh network between the portable devices.

28. The method of claim 23, further comprising transmitting a search message over a second network to at least the tracking portable device, the search message identifying the target portable device to be located.

29. The method of claim 23, further comprising transmitting a reply message from the base station over one of the broadcasting mesh network and a second network to the target portable device, the reply message acknowledging receipt of an alarm message from the target portable device.

30. The method of claim 23, wherein the estimating is performed at one of the portable devices or at a base station.

31. The method of claim 23, wherein the estimating operation further comprises analyzing the target transmission signal and, based thereon, providing at least one of a status and alarm indication.

32. The method of claim 23, wherein the estimating operation further comprises providing at least one of a status and alarm indication to a user of the tracking portable device via LEDs provided on the tracking portable device.

33. The method of claim 23, further comprising configuring the portable devices to communicate with a base station over a second network, the base station and portable devices conveying data packets bidirectionally over the second network, the data packets including a device ID and at least one of air pressure data, temperature data, alarm data, evacuation acknowledge data and withdraw status data.

34. The method of claim 23, wherein the tracking portable device begins the detecting operation in response to receipt of an alarm message.

35. The method of claim 23, further comprising triggering an alarm message at the target portable device, at least one of the detecting and estimating operations being initiated in response to the alarm message.

* * * * *